US011263732B2

(12) United States Patent
Serlie et al.

(10) Patent No.: US 11,263,732 B2
(45) Date of Patent: Mar. 1, 2022

(54) IMAGING PROCESSING APPARATUS AND METHOD FOR MASKING AN OBJECT

(71) Applicant: KONINKLIJKE PHILIPS ELECTRONICS N.V., Eindhoven (NL)

(72) Inventors: Iwo Willem Oscar Serlie, Eindhoven (NL); Rudolph Martherus, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1048 days.

(21) Appl. No.: 14/361,116

(22) PCT Filed: Nov. 14, 2012

(86) PCT No.: PCT/IB2012/056402
§ 371 (c)(1),
(2) Date: May 28, 2014

(87) PCT Pub. No.: WO2013/080071
PCT Pub. Date: Jun. 6, 2013

(65) Prior Publication Data

US 2014/0334680 A1 Nov. 13, 2014

Related U.S. Application Data

(60) Provisional application No. 61/563,990, filed on Nov. 28, 2011.

(51) Int. Cl.
*G06T 5/20* (2006.01)
*G06T 7/194* (2017.01)
(Continued)

(52) U.S. Cl.
CPC .............. *G06T 5/20* (2013.01); *G06T 7/0012* (2013.01); *G06T 7/12* (2017.01); *G06T 7/155* (2017.01);
(Continued)

(58) Field of Classification Search
CPC ................ G06T 7/0083; G06T 7/0091; G06T 2207/20036; G06T 2207/20144; G06T 2207/30068; G06T 7/0012
See application file for complete search history.

(56) References Cited

U.S. PATENT DOCUMENTS 4,787,393 A * 11/1988 Fukukita ............. G01S 7/52074 348/163
5,103,254 A * 4/1992 Bell ................... H04N 5/23212 348/E5.034

(Continued)

FOREIGN PATENT DOCUMENTS

DE 102007057013 A1 5/2009
JP S61161583 A 7/1986

(Continued)

OTHER PUBLICATIONS

Bakic, Predrag R., et al. "Mammogram synthesis using a 3D simulation. I. Breast tissue model and image acquisition simulation." Medical physics 29.9 (2002): 2131-2139. (Year: 2002).*

(Continued)

*Primary Examiner* — Pinalben Patel
(74) *Attorney, Agent, or Firm* — Larry Liberchuk

(57) ABSTRACT

Image processing apparatus 110 for applying a mask to an object, comprising an input 120 for obtaining an image 122, a processor 130 for (i) detecting the object in the image, and (ii) applying the mask to the object in the image for obtaining an output image 60, and the processor being arranged for said applying the mask to the object by (j)
(Continued)

establishing an object contour of the object, (jj) generating, based on the object contour, a mask being smaller than the object, and (jjj) positioning the mask over the object for masking a body of the object while keeping clear a border area of the object.

20 Claims, 7 Drawing Sheets

(51) Int. Cl.
*G06T 7/12* (2017.01)
*G06T 7/155* (2017.01)
*G06T 7/00* (2017.01)

(52) U.S. Cl.
CPC .... *G06T 7/194* (2017.01); *G06T 2207/20036* (2013.01); *G06T 2207/30068* (2013.01)

(56) References Cited

U.S. PATENT DOCUMENTS

| | | | | |
|---|---|---|---|---|
| 5,687,251 | A * | 11/1997 | Erler | G06T 7/0012 382/133 |
| 5,768,413 | A * | 6/1998 | Levin | G06T 7/0083 382/131 |
| 5,896,463 | A | 4/1999 | Kuhn | |
| 6,094,508 | A * | 7/2000 | Acharya | G06T 7/0083 382/199 |
| 6,137,898 | A * | 10/2000 | Broussard | B29C 49/0021 382/132 |
| 6,352,509 | B1 | 3/2002 | Kawagishi et al. | |
| 7,623,728 | B2 * | 11/2009 | Avinash | G06T 5/002 382/133 |
| 7,702,149 | B2 | 4/2010 | Ohkubo et al. | |
| 7,826,683 | B2 * | 11/2010 | Phillips | G06T 15/503 345/622 |
| 8,180,133 | B2 * | 5/2012 | Omi | G06T 7/0083 378/4 |
| 8,401,285 | B1 * | 3/2013 | Rezaee | G06T 7/0012 382/128 |
| 8,717,355 | B2 | 5/2014 | Newton | |
| 8,797,619 | B2 | 8/2014 | Kido et al. | |
| 9,547,908 | B1 * | 1/2017 | Kim | G06T 5/20 |
| 2002/0093670 | A1 * | 7/2002 | Luo | G06K 9/52 358/1.9 |
| 2006/0173317 | A1 * | 8/2006 | Lee | A61B 8/08 600/437 |
| 2007/0055178 | A1 * | 3/2007 | Verre | G06T 7/0012 600/594 |
| 2007/0188510 | A1 | 8/2007 | Kokemohr | |
| 2008/0002872 | A1 | 1/2008 | Gatesoupe | |
| 2009/0016580 | A1 * | 1/2009 | Yamamichi | A61B 6/502 382/128 |
| 2009/0099563 | A1 * | 4/2009 | Ciaccio | A61B 5/1075 606/41 |
| 2009/0273608 | A1 * | 11/2009 | Buchanan | G06F 19/321 345/592 |
| 2010/0046837 | A1 * | 2/2010 | Boughorbel | G06T 7/50 382/173 |
| 2010/0061613 | A1 | 3/2010 | Choi et al. | |
| 2010/0150419 | A1 * | 6/2010 | Dutta | G06K 9/03 382/131 |
| 2010/0246989 | A1 * | 9/2010 | Agrawal | G06T 5/003 382/255 |
| 2010/0271466 | A1 * | 10/2010 | Newton | G06T 15/503 348/51 |
| 2011/0002519 | A1 | 1/2011 | Tomisaki et al. | |
| 2011/0123074 | A1 * | 5/2011 | Nie | G06T 5/008 382/128 |
| 2011/0123075 | A1 | 5/2011 | Nie et al. | |
| 2011/0190632 | A1 * | 8/2011 | Kim | A61B 8/14 600/443 |
| 2011/0200238 | A1 | 8/2011 | Garud et al. | |
| 2011/0206250 | A1 * | 8/2011 | McGinnis | G06T 7/0012 382/128 |
| 2011/0274336 | A1 * | 11/2011 | Nielsen | G06K 9/0014 382/133 |
| 2013/0077844 | A1 * | 3/2013 | Vija | G06T 7/0012 382/131 |
| 2014/0334680 | A1 | 11/2014 | Serlie et al. | |
| 2015/0078640 | A1 * | 3/2015 | Guo | G06T 7/0083 382/131 |

FOREIGN PATENT DOCUMENTS

| | | | |
|---|---|---|---|
| JP | 2002374403 | A | 12/2002 |
| JP | 2009106335 | A | 5/2009 |

OTHER PUBLICATIONS

Meng, X. et al., "Enhancement Strategy for Region of Interest Based on Attentional Shroud", Computer Engineering, vol. 37 No. 4, Abstract.

* cited by examiner

166

IMAGING PROCESSING APPARATUS AND METHOD FOR MASKING AN OBJECT

This application is a national stage application under 35 U.S.C. § 371 of International Application No. PCT/IB2012/056402 filed on Nov. 14, 2012 and published in the English language on Jun. 6, 2013 as International Publication No. WO/2013/080071, which claims priority to U.S. Application No. 61/563,990 filed on Nov. 28, 2011, the entire disclosures of which are incorporated herein by reference.

FIELD OF THE INVENTION

The invention relates to an image processing apparatus and a method for applying a mask to an object in an image. The invention further relates to a workstation and imaging apparatus comprising the image processing apparatus set forth, and to a computer program product for causing a processor system to perform the method set forth.

BACKGROUND OF THE INVENTION

In the fields of image evaluation and image display, it may be desirable to mask an object in an image. A reason for this is that the user may otherwise be distracted or hindered by the object when viewing the image. By masking the object, the visibility of the object in the image is reduced. As a result, the user can more easily direct his attention to other areas in the image, e.g., to another object or to adjacent areas of the object.

It is known to automatically mask an object in an image. For example, U.S. 2011/0123074 A1 discloses a system and method for altering the appearance of an artificial object in a medical image. An artificial object is first identified in the medical image, such as identifying a breast implant in a mammography image. The prominence of the artificial object is then reduced, e.g., by suppressing the brightness or masking the artificial object out altogether. The resulting medical image with the altered artificial object is then displayed to a user. It is said that, as a result, the medical image can be more accurately analyzed without requiring the user to adjust the image on his or her own.

A problem of the aforementioned system and method is that it is difficult for a user to determine whether the automatic masking of the object was erroneous.

SUMMARY OF THE INVENTION

It would be advantageous to have an improved apparatus or method enabling a user to more easily determine whether the automatic masking of the object was erroneous.

To better address this concern, a first aspect of the invention provides an image processing apparatus for applying a mask to an object, comprising an input for obtaining an image, a processor for (i) detecting the object in the image, and (ii) applying the mask to the object in the image for obtaining an output image, and the processor being arranged for said applying the mask to the object by (j) establishing an object contour of the object, (jj) generating, based on the object contour, a mask being smaller than the object, and (jjj) positioning the mask over the object for masking a body of the object while keeping clear a border area of the object.

In a further aspect of the invention, a workstation and an imaging apparatus is provided comprising the image processing apparatus set forth.

In a further aspect of the invention, a method is provided for applying a mask to an object, comprising obtaining an image, detecting the object in the image, and applying the mask to the object in the image for obtaining an output image by (j) establishing an object contour of the object, (jj) generating, based on the object contour, a mask being smaller than the object, and (jjj) positioning the mask over the object for masking a body of the object while keeping clear a border area of the object.

In a further aspect of the invention, a computer program product comprising instructions for causing a processor system to perform the method set forth.

The input obtains an image which comprises an object. As a result, when displaying the image, the object is visible to a user. The processor detects the object in the image, and applies a mask to the object. The mask is image data intended for reducing the visibility of the object in the image. By applying the mask to the object, the image data of the mask is inserted over, or affects the visibility of the image data of the object. As a result, when displaying the output image, the visibility of the object in the output image is reduced. The processor is arranged for applying the mask to the object in the following manner. Firstly, an outline of the object is determined. The outline indicates a size of the object.

Based on the outline of the object, the mask is generated as being smaller than the object. As a result, the mask does not cover the entire object. Finally, the mask is positioned such over the object that a border area of the object is kept visible, whereas a bulk of the object is covered by the mask. As a result, the visibility of the bulk of the object in the output image is reduced, while the visibility of the border area of the object is not affected.

By masking the body of the object while keeping clear the border area of the object, the user is less distracted or hindered by the object as the bulk of the object is reduced in visibility. However, the border area of the object is kept clear of the mask, and is thus not reduced in visibility or otherwise modified as a result of applying the mask to the object.

The invention is partially based on the recognition that it is convenient for a user to obtain automatic masking of an object in an image, but that the automatic masking of the object may be erroneous due to, e.g., failure to detect the object correctly. As a result, the mask may cover adjacent areas of the object that may be of relevance to the user. The inventors have recognized that a user, when viewing the output image, is typically unable to determine whether the automatic masking of the object was erroneous and thus whether adjacent areas of the object were covered. A reason for this is that determining whether the mask is applied correctly to the object involves comparing the mask to the object, which is now hindered by the object being reduced in visibility by said masking of the object.

By keeping clear the border area of the object in the automatic masking of the object, the user may, from seeing the border area of the object, infer that the mask is applied such that no adjacent areas of the object are covered. Similarly, when no border area of the object is visible, the user may infer that the automatic masking of the object was erroneous, and thus that adjacent areas of the object may be covered. Moreover, the effect of masking is generally maintained as the body of the object is masked and thus reduced in visibility.

Advantageously, relevant information in adjacent areas of the object is preserved. Advantageously, relevant information in the border area of the object is preserved. Advantageously, a user is more likely to rely on the automatic masking of the object knowing that he may infer from the output image whether said automatic masking was erroneous. Advantageously, it is not needed for the automatic masking of the object to be 100% reliable, as errors in said automatic masking that may result in adjacent areas of the object being covered are easily noticeable by the user. Advantageously, when the image is a medical image, diagnostic information in the border area of the object is kept free, i.e., not masked.

Optionally, the processor is arranged for generating the mask by reducing the object contour in size along a direction inwards the object for obtaining a mask contour of the mask. By reducing the object contour in size in an inwards direction, the mask contour is similarly shaped as the object contour while having a smaller size. The mask therefore fits inside the object contour. As a result, when positioning the mask at a suitable position over the object, a border area of the object will automatically be kept clear.

Optionally, the processor is arranged for reducing the object contour in size by applying a morphological erosion technique to the object contour. Morphological erosion techniques are particularly well suited for reducing the object contour in size.

Optionally, the processor is arranged for detecting, in the image, an object gradient constituting a gradual transition between the object and its surroundings for keeping clear the object gradient and the border area of the object between the mask and the object gradient. The transition between the object and its surroundings in the image may be a gradual transition. Hence, the contour of the object is not constituted by a line being infinitely thin, but rather by an area in the image corresponding to said gradual transition. A reason for this may be that the resolution of an imaging device used in acquiring the image was limited, e.g. due to a limited size of detector elements. The object gradient corresponds neither fully to the object nor its surroundings, but rather is a gradual transition between both. The border area of the object is thus located inwards of the object gradient. The object gradient may contain relevant information for the user. By detecting the object gradient, it is known where in the image the gradual transition between the object and its surroundings is located. Accordingly, the object gradient and the border area of the object are both kept clear.

Optionally, the processor is arranged for establishing the border area of the object having a displayed width between 2 mm and 10 mm when displaying the output image on a display. The processor thus establishes the border area of the object as having a width, when measured on the display used for displaying the output image, between 2 mm and 10 mm. Said range constitutes a suitable compromise between showing a large enough border area of the object so as to be visible to a user, and masking an as large as possible portion of the object for reducing the overall visibility of the object.

Optionally, the image processing apparatus further comprises a user input for enabling a user determine a zoom factor for zooming in or out of the output image, and the processor is arranged for generating the mask based on the zoom factor for maintaining a displayed width of the border area of the object when displaying the output image on a display based on the zoom factor. Zooming in or out of the output image typically results in a displayed width of structure increasing or decreasing proportionally with the zoom factor. This may be undesired for the border area. For example, when zooming out, the displayed width of the border area may decrease such that the border area is not clearly visible to the user anymore. Similarly, when zooming in, the displayed width of the border area may become unnecessarily large, resulting in the user being distracted or hindered by the border area. By using the zoom factor to maintain the displayed width of the border area, e.g., at a constant value or within a limited range, it is avoided that, as a result of zooming, the border area is not clearly visible to the user anymore or becomes unnecessarily large.

Optionally, the processor is arranged for, when applying the mask to the object, generating a mask gradient in the output image for establishing a gradual transition between the mask and the object. As such, a gradual transition is introduced between the mask and the object in the output image. Advantageously, the user is not distracted or hindered by a sharp transition between the object and the mask in the output image.

Optionally, the processor is arranged for generating the mask gradient by blending of a border area of the mask with the object. Blending the border area of the mask with the object is particularly well suited for generating the mask gradient.

Optionally, the processor is arranged for (i) detecting, in the image, an object gradient constituting a gradual transition between the object and its surroundings, and (ii) generating the mask gradient as differing in width and/or shape from the object gradient for visually differentiating the object gradient from the mask gradient in the output image. The user may therefore visually distinguish the object gradient from the mask gradient. Advantageously, the user is less likely to erroneously identify the mask gradient as the object gradient. Advantageously, the user may easily identify the mask gradient in the output image for easily identifying synthetically introduced parts of the output image.

Optionally, the image processing apparatus further comprises a user input for enabling a user to determine a width and/or shape of the mask gradient. The user can thus manually determine the width and/or shape of the mask gradient.

Optionally, the processor is arranged for masking the body of the object by reducing a brightness and/or contrast of the body of the object. By reducing a brightness and/or contrast of the body of the object, the visibility of the body of the object is reduced while still providing visual information concerning the body of the object, e.g., edges comprised therein. Advantageously, a user may identify the object despite the body of the object being masked.

It will be appreciated by those skilled in the art that two or more of the above-mentioned embodiments, implementations, and/or aspects of the invention may be combined in any way deemed useful.

Modifications and variations of the workstation, the imaging apparatus, the method, and/or the computer program product, which correspond to the described modifications and variations of the image processing apparatus, can be carried out by a person skilled in the art on the basis of the present description.

A person skilled in the art will appreciate that the method may be applied to multi-dimensional image data, e.g. to two-dimensional (2-D), three-dimensional (3-D) or four-dimensional (4-D) images. A dimension of the multi-dimensional image data may relate to time. For example, a three-dimensional image may comprise a time domain series of two-dimensional images. The image may be a medical image, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM). However, the image may also be of any other type, e.g., a geological or astrophysical image.

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings.

FIG. 5*b* shows the output image of FIG. 5*a* after being zoomed in;

DETAILED DESCRIPTION OF EMBODIMENTS

Figure 1:
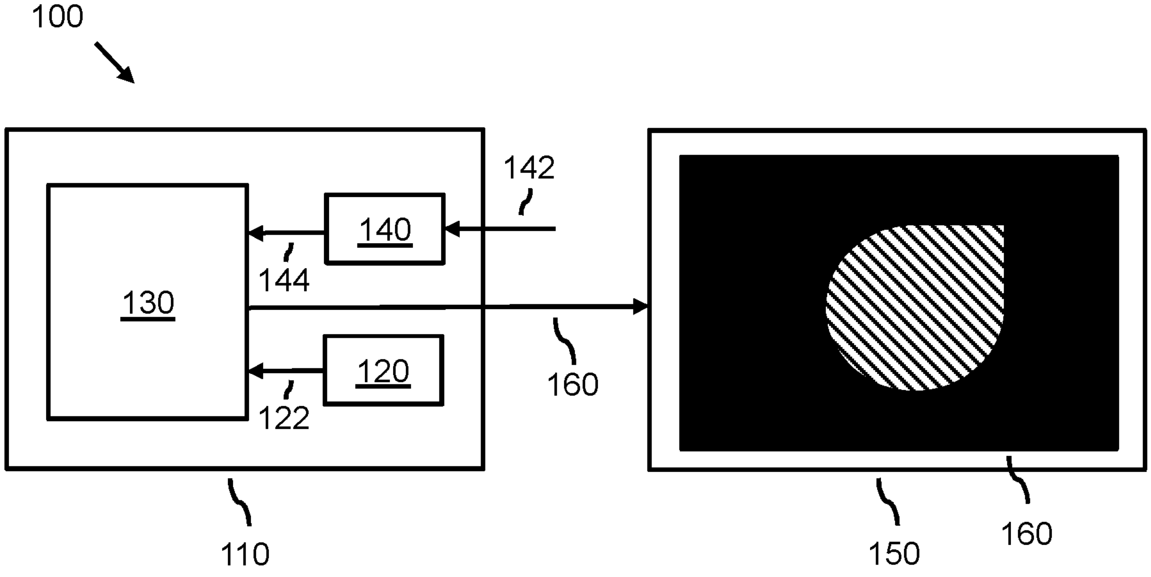
FIG. 1 shows an image processing apparatus according to the present invention connected to a display for displaying an output image.

FIG. 1 shows an image processing apparatus 110, henceforth referred to as apparatus 100, for applying a mask to an object. The apparatus 110 comprises an input 120 for obtaining an image 122. The input 120 may obtain the image 122 from outside the apparatus 110, e.g., by receiving the image 122 from a transmitter, or from inside the apparatus 110, e.g., by obtaining the image 122 from an internal database. The apparatus 110 further comprises a processor 130 for applying a mask to an object in the image 122. For providing the image 122 to the processor 130, the input 120 is shown to be connected to the processor 130. Moreover, the apparatus 110 is shown to be connected to a display 150 for providing an output image 160 to the display 150. The display 150 is shown to be an external display, i.e., not being part of the apparatus 110. Alternatively, the display 150 may be part of the apparatus 110. The apparatus 110 and the display 150 may together form a system 100.

The apparatus 110 may further comprise a user input 140 for obtaining selection data 144 from the user. For that purpose, the user input 140 may be connected to a user interface means (not shown in FIG. 1) such as a mouse, keyboard, touch screen, etc, for receiving user interface commands 142 from the user via the user interface means.

Figure 2:
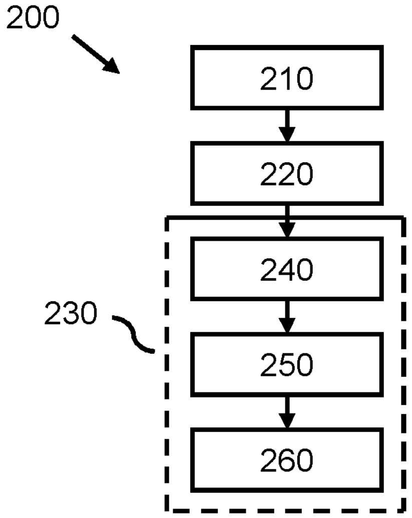
FIG. 2 shows a method according to the present invention.

FIG. 2 shows a method 200 for applying a mask to an object, comprising, in a first step titled "OBTAINING AN IMAGE", obtaining 210 an image. The method 200 further comprises, in a second step titled "DETECTING THE OBJECT", detecting 220 the object in the image. The method 200 further comprises, in a third step titled "APPLYING THE MASK", applying 230 the mask to the object in the image for obtaining an output image. The third step of applying 230 the mask to the object itself comprises, in a first intermediate step titled "ESTABLISHING AN OBJECT CONTOUR", establishing 240 an object contour of the object. The third step further comprises, in a second intermediate step titled "GENERATING A MASK", generating 250, based on the object contour, a mask being smaller than the object. The third step further comprises, in a third intermediate step titled "POSITIONING THE MASK", positioning 260 the mask over the object for masking a body of the object while keeping clear a border area of the object. The method 200 may correspond to an operation of the apparatus 110, and henceforth will be further discussed in reference to said operation of the apparatus 110. It is noted, however, that the method 200 may also be performed in separation of said apparatus 110, e.g., using a different apparatus.

Figure 3:
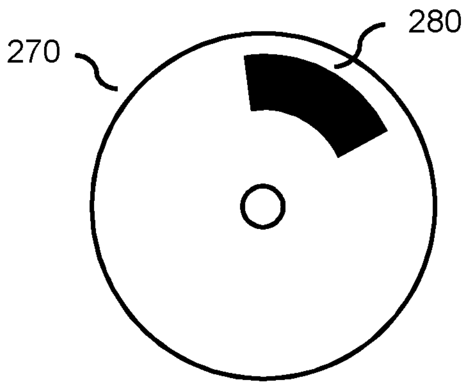
FIG. 3 shows a computer program product according to the present invention.

FIG. 3 shows a computer program product 280 comprising instructions for causing a processor system to perform the method according to the present invention. The computer program product 280 may be comprised on a computer readable medium 270, for example in the form of as a series of machine readable physical marks and/or as a series of elements having different electrical, e.g., magnetic, or optical properties or values.

Figure 4A:
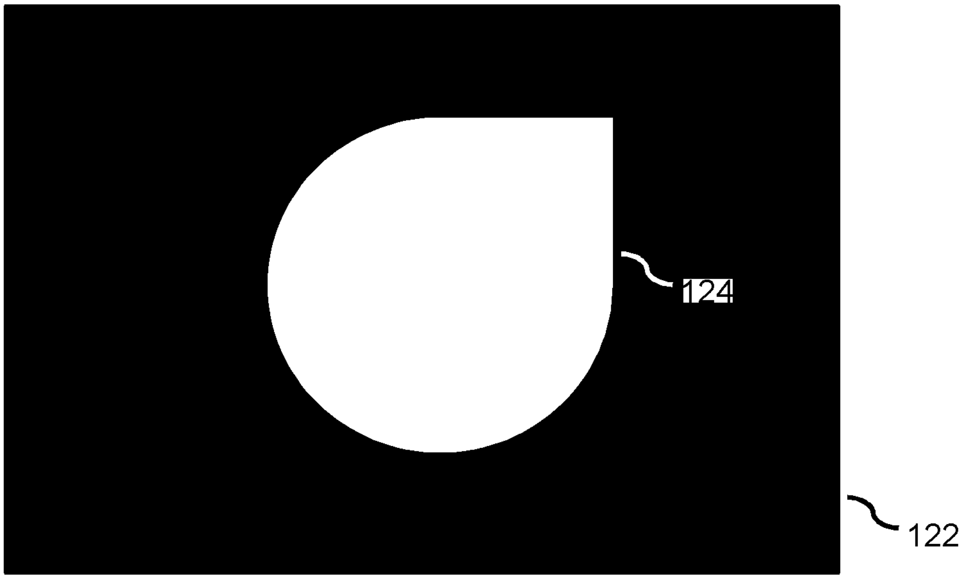
FIG. 4*a* shows an image comprising an object to be masked.
Figure 4B:
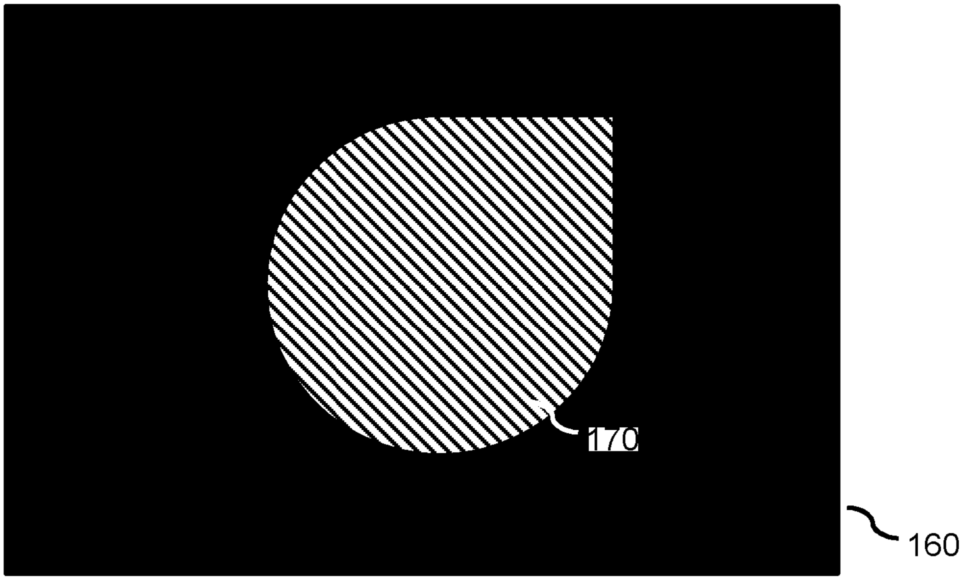
FIG. 4*b* shows an output image in which the object is entirely masked.

The operation of the apparatus 110 will be explained in reference to FIGS. 4*a* through 9. FIG. 4*a* shows an image 122 comprising an object 124 to be masked. FIG. 4*b* shows an output image 160 comprising the object 124 being entirely masked by a mask 170. The mask 170 is schematically indicated in FIG. 4*b* by a line pattern. As a consequence of the mask 170 covering the object 124, the object 124 in its entirety is not visible anymore. A user viewing the output image 160 therefore is unable to determine whether or not the mask 170 covers an additional area of the image 122, e.g., the surroundings of the object 124.

Figure 5A:
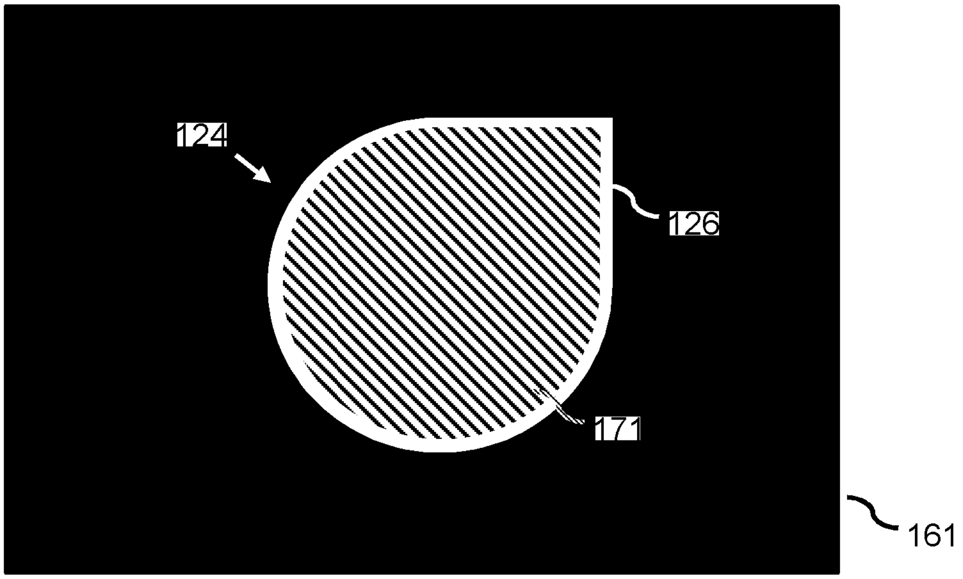
FIG. 5*a* shows an output image in which the object is masked according to the present invention for keeping clear a border area of the object.

FIG. 5*a* shows an output image 161 in which the object 124 is masked according to the present invention for keeping clear a border area 126 of the object 124. The border area 126 is visible as an area at the border of the object 124 having a non-zero width. For keeping clear the border area 126 of the object 124 in the output image 161, the processor 130 detects the object 126 in the image. Detecting the object 126 in the image may comprise applying an object detection technique or object segmentation technique to the image, as are known per se from the fields of image analysis and object detection. Alternatively, or additionally, detecting the object 126 in the image may comprise receiving a location or a detection result from a previously applied object detection technique or object segmentation technique. Having detected the object 126 in the image, the processor 130 then applies the mask 171 to the object 124 in the image, thereby generating the output image 161.

Applying the mask 171 to the object 124 is performed by firstly establishing an object contour of the object 124. The object contour corresponds to the outline of the object 124 in the image. The object contour is visible in the example shown in FIG. 5*a* as the sharp edge between the dark background and the bright object 124. The object contour may be established by the processor 130 as part of detecting the object 126 in the image. However, establishing the object contour may also involve the processor 130 performing a separate step. For example, detecting the object 124 may involve detecting a center of the object 124, e.g., a seed location. Establishing the object contour may involve applying a region growing technique to the seed location to obtain the object contour. Establishing the object contour may also involve determining a lowest-cost circular path, with the cost being defined inversely to the strength and/or amount of edges constituting a potential circular path.

It will be appreciated that the above techniques are known per se from the fields of image analysis and object detection. Moreover, it is noted that various other techniques from said fields may be advantageously used for detecting the object 124 and/or establishing the object contour. In particular, prior knowledge of the object 124 that is to be detected in the image and/or the object contour that is to be established may be advantageously used. For example, the aforementioned lowest-cost circular path may be well-suited for establishing a contour of objects that have an approximately circular shape. For example, when the image is a medical image of a breast, i.e., the medical image is a mammography image, and the object 124 is a breast implant, i.e., an artificial object inserted into the patient, knowledge that the breast implant is approximately circular and located predominantly at a side of the image may be used to improve the reliability, i.e., avoid erroneous results, of detecting the object 124 and/or establishing the object contour.

Having established the object contour, the processor 130 generates, based on the object contour, a mask 171 being smaller than the object 124. Generating the mask 171 as being smaller than the object 124 may comprise reducing the object contour in size along a direction inwards the object 124, thereby obtaining a mask contour of the mask 171. Reducing the object contour in size may comprise establishing the mask contour within the object 124 at a given distance from the object contour and in a direction that is locally orthogonal with respect to the object contour. The distance may be in pixels. Reducing the object contour in size may also comprise applying a morphological erosion technique to the object contour, as is known per se from the field of morphological image processing.

Having obtained the mask contour, the mask 171 itself may be generated by 'filling in' the mask contour with mask values, e.g., luminance, chrominance and/or an opacity values. The mask values may be identical. As a result, the mask may be 'filled in' with identical mask values. As a result of the above, an explicit representation of the mask 171 may be obtained, e.g., in a memory of the apparatus 110. It will be appreciated, however, that the mask 171 may also be generated implicitly, e.g., being defined by the mask contour and a single mask value, e.g., a luminance, chrominance and/or opacity value.

Having generated the mask 171, the processor 130 positions the mask 171 over the object 124 in order to mask a body of the object 124 while keeping clear a border area 126 of the object 124. The result is shown in FIG. 5*a*, where a body, i.e., a bulk, of the object 124 is masked, while a border area 126 of the object 124 remains visible. Typically, positioning the mask 171 over the object 124 involves positioning the mask 171 centrally with respect to the object 124, i.e., for fitting the mask 171 inside the object 124 such that the border area 126 of the object 124 is kept clear. In case the mask contour is obtained by reducing the object contour in size, the mask contour may already be positioned such that the body of the object 124 is masked and the border area 126 of the object 124 is kept clear. As such, the positioning of the mask 171 may be an implicit part of generating the mask 171.

Figure 5B:
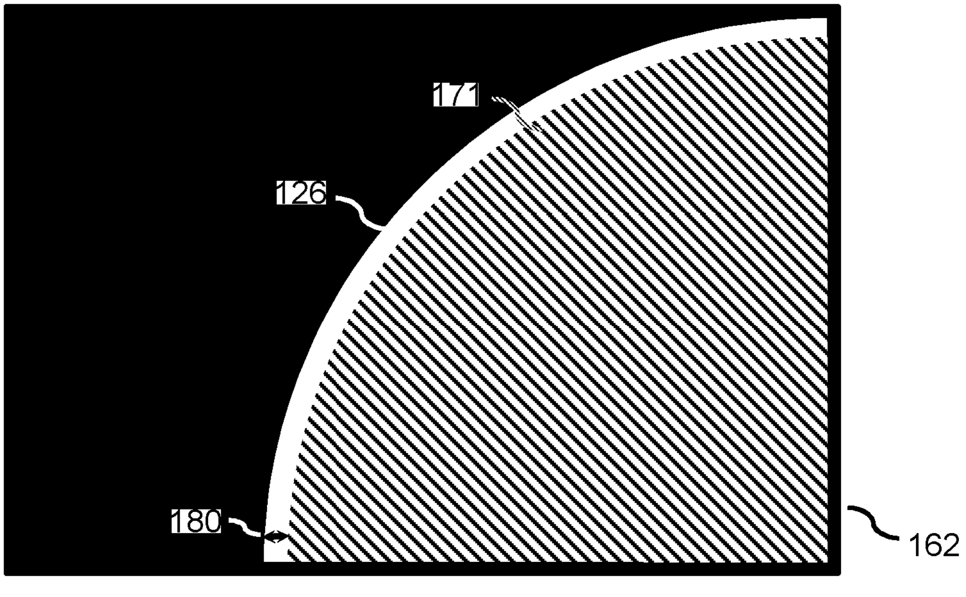

FIG. 5*b* shows a result shows a zoomed view of the output image 161 of FIG. 5*a*. Here, the zooming is due to an operation of the apparatus 110, i.e., not for sake of explaining FIG. 5*a*. For enabling a user to zoom in or out of the output image 161, the user input 140 may be arranged for enabling the user to determine a zoom factor. The user interface commands 142 may be indicative of the zoom factor. The zoom factor may be received by the processor 130 from the user input 140 in the form of the selection data 144.

In general, the processor 130 may be arranged for establishing the border area 126 of the object 124 having a displayed width 180 when displaying the output image 162 on the display 150. The displayed width 180 may be a constant value or be set within a limited range. For example, the border area 126 of the object 124 may be established as having a displayed width 180 between 2 mm and 10 mm. The displayed width 180 may be 5 mm. Here, the displayed width 180 is a width of the border area 126 when measured on the display 150. The displayed width 180 typically corresponds to a width that allows a user to perceive the border area 126 on the display 150 and/or allows the user to perceive the object contour as being separated from the mask contour. The displayed width 180 may depend on, e.g., a size of the display 150, a viewing distance of the user to the display 150, etc. Accordingly, the mask 171 may be generated as being smaller than the object 124 by an amount that results in the border area 126 of the object 124 having said displayed width 180. It will be appreciated that the processor 130 may arranged for establishing the border area 126 of the object 124 having a pixel width in the output image 162, with said pixel width having been previously determined to correspond to the displayed width 180 on the display 150. For that purpose, a conversion factor between pixel width and displayed width 180 may be established as a function of, e.g., a resolution of the output image 162 and a size of the display 150.

The processor 130 may be arranged for generating the mask 171 based on the zoom factor for maintaining the displayed width 180 of the border area 126 of the object 124 when displaying the output image 162 on the display 150 based on the zoom factor. A result of the above is shown in FIGS. 5*a* and 5*b*, where the displayed width 180 of the border area 126 of the object 124 is shown to be approximately the same in both FIG. 5*a* as well as FIG. 5*b* despite FIG. 5*b* showing a zoomed view of the output image 161 of FIG. 5*a*. Consequently, the processor 130 may be arranged for dynamically re-generating the mask 171 for each zoom factor, or for each sufficiently large change in zoom factor.

The processor 130 may be arranged for disabling applying the mask 171 to the object 124 when the output image 162 is zoomed out above a certain threshold. The threshold may correspond to a zoom factor in which the object 124 is below a given size when displayed on the display 150. At the given size, the object 124 may not be regarded as hindering the user anymore. Hence, masking the object 124 may be disabled. Moreover, in general, the processor 130 may be arranged for disabling applying the mask 171 to the object 124 when the object is below said given size when displayed on the display 150.

Figure 6A:
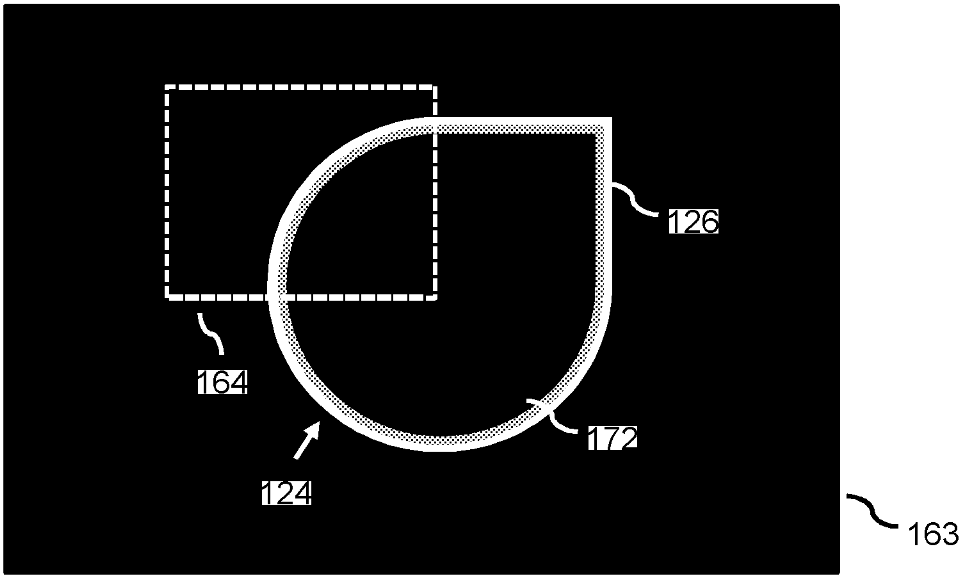
FIG. 6*a* shows the body of the object being masked by reducing its brightness.

FIG. 6*a* shows an example of a mask 172 being applied to the object 124. Here, the processor 130 may be arranged for masking the body of the object 124 by reducing a brightness of the body of the object 124. As a result, the visibility of the object 124 is reduced by virtue of the body of the object 124 being reduced in brightness. The object 124 was shown in FIG. 4*a* to be homogenous. However, in case the object 124 were to contain details, e.g., edges or textures, a reduction in the brightness of the body of the object 124 may allow the user to still perceive the details within the body of the object 124, albeit at a lower brightness. Alternatively, masking the body of the object 124 may comprise the pixels of the body of the object 124 being replaced by pixels of the mask 172 in the output image 163. It will be appreciated that many other types of masking may also be advantageously used. For example, the body of the object 124 may be masked by reducing its contrast.

Figure 6B:
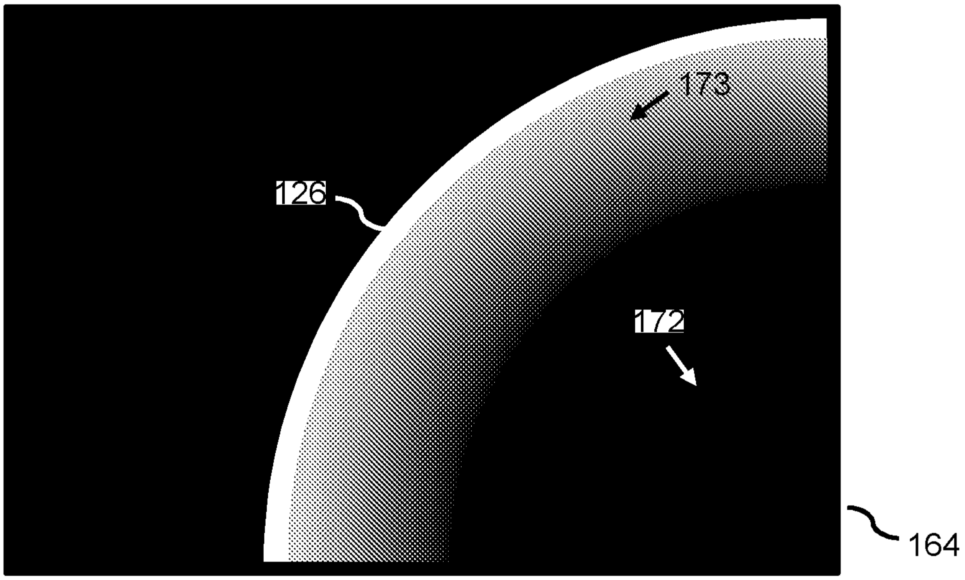
FIG. 6*b* shows a cut-out view of FIG. 6*a* showing a mask contour.

FIG. 6*b* shows a cut-out view of FIG. 6*a*. It is noted that the cut-out view is for sake of explaining FIG. 6*a*. The cut-out view therefore does not correspond to the zooming operation of the apparatus 110 as shown in FIG. 5*b*. Rather, FIG. 6*b* merely shows a larger view of the portion 164 of FIG. 6*a*. Visible in FIG. 6*b* is a result of the following: the processor 130 may be arranged for, when applying the mask 172 to the object 124, generating a mask gradient 173 in the output image 163 for establishing a gradual transition between the mask 172 and the object 124. As a result, FIG. 6*b* shows a gradual transition between the mask 172 and the object 124. The processor 130 may be arranged for generating the mask gradient 173 by blending of a border area of the mask 172 with the object. Blending may involve performing an so-termed alpha-blending, in which a contribution of the object 124, e.g., of pixel values of the object 124, to the mask gradient 173 decreases in an inward direction towards the mask 172 whereas a contribution of the mask 172, e.g., of pixel values of the mask 172, to the mask gradient 173 increases in said inward direction. The processor 130 may also be arranged for generating the mask gradient 173 by inserting a pre-determined mask gradient into the output image 163, e.g., having a predetermined width and/or shape.

In general, the processor 130 may be arranged for determining or modifying the width and/or shape of the mask gradient 173 based on a zoom factor used for displaying the output image 163, or based on a zoom factor used for displaying a portion thereof, e.g., in a virtual magnifying glass. Moreover, the processor 130 may be arranged for determining or modifying the width and/or shape of the mask gradient 173 based on a location of the mask gradient 173 in the output image 163. For example, when the mask gradient 173 is located at the edge of the output image 163, the width of the mask gradient 173 may be zero.

The user input 140 may be arranged for enabling a user to determine a width and/or shape of the mask gradient 173. The user interface commands 142 may be indicative of the width and/or shape of the mask gradient 173. Said width and/or shape may be received by the processor 130 from the user input 140 in the form of the selection data 144. The shape may be adapted to the actual appearance of the mask 172 and/or the object 124. For example, when the user determines the mask gradient 173 to be 'S'-shaped, a maximum and/or a minimum of the 'S'-shape may set to correspond in appearance with mask 172 and/or the object 124. For example, the shape may be scaled or adjusted for obtaining a gradual transition between a luminance of the mask 172 and a luminance of the object.

Figure 7A:
FIG. 7*a* shows four medical images each comprising an object.

FIG. 7*a* shows four medical images being presented side-by-side, i.e., as a combined medical image 165. The medical images are mammography images, showing various viewpoints of a patient's breasts. Visible in all of the mammography images is a presence of an object in the form of a breast implant 125-128. As a consequence of the imaging modality used in obtaining the mammography images, the breast implant 125-128 appears as a bright object. A user viewing the medical image 165 may be hindered by the breast implant 125-128 appearing as a bright object. For example, the user's adaptation to a dark reading environment, used for studying the medical image 165, may be disrupted. As a result, the user may not be able to discern details next to the breast implant 125-128.

Figure 7B:
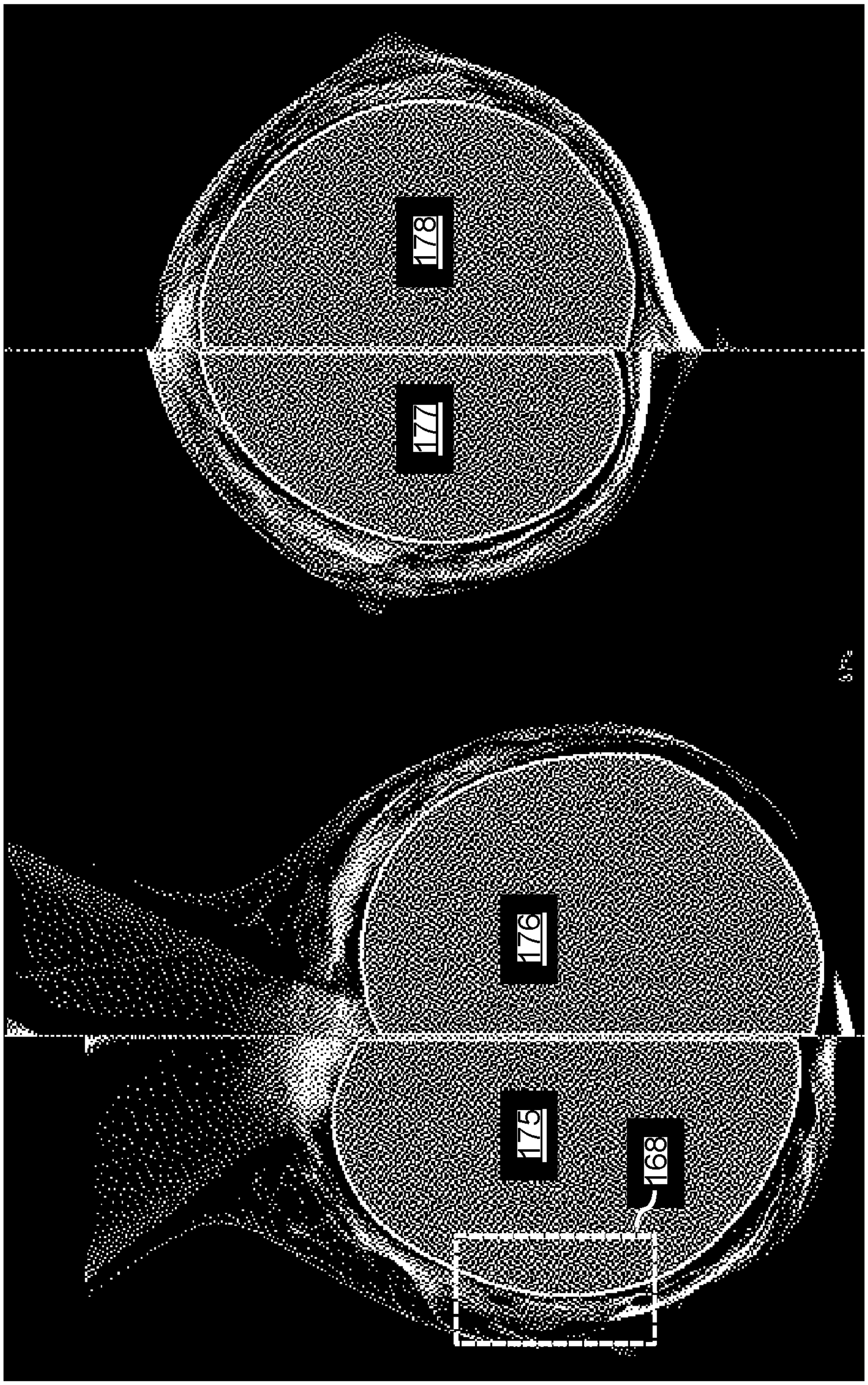
FIG. 7*b* shows the objects being masked according to the present invention.

FIG. 7*b* shows a result of the breast implant 125-128 being masked in accordance with the present invention. Accordingly, the bulk of the breast implant 125-128 is masked by a mask 175-178 in each of the output images within the combined output image 166. Moreover, a border area of the breast implant 125-128 is kept visible.

Figure 8A:
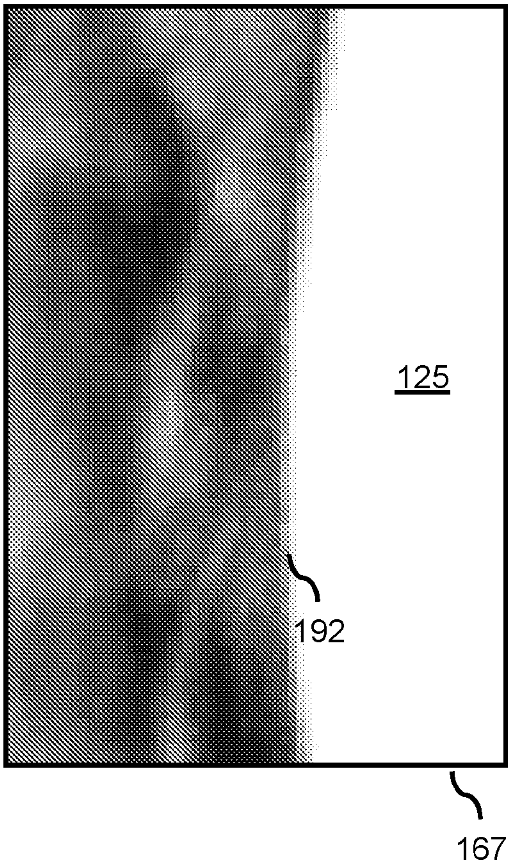
FIG. 8*a* is a cut-out view of FIG. 7*a* showing an object contour.
Figure 8B:
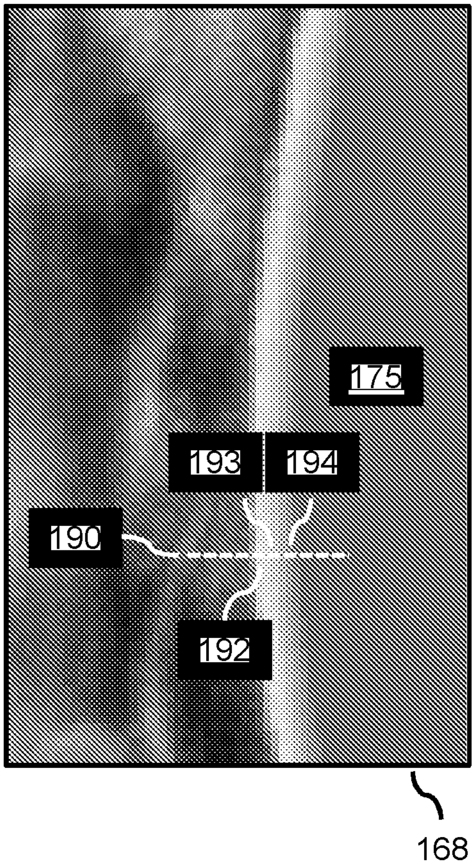
FIG. 8*b* is a cut-out view of FIG. 7*b* showing the object being masked according to the present invention for keeping clear a border area of the object.
Figure 9:
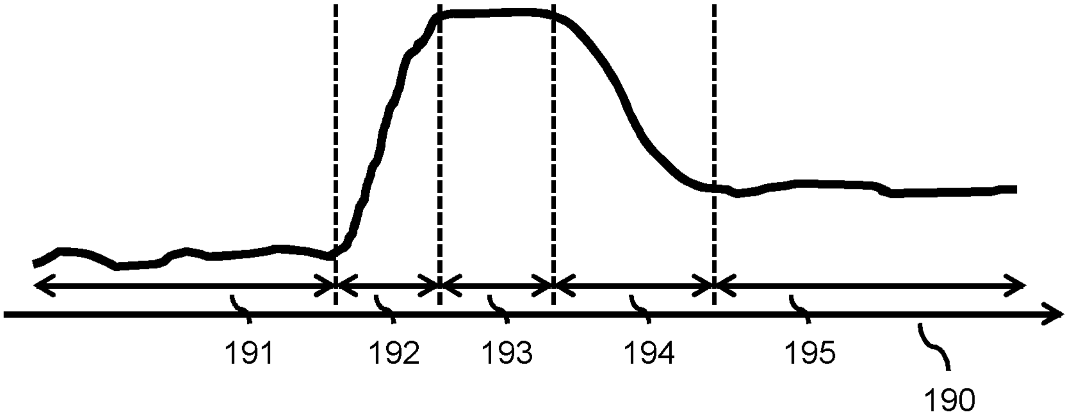
FIG. 9 shows a plot of the intensity as a function of a position along a line segment as indicated in FIG. 8*b*, the plot showing the border area of the object.

FIGS. 8*a*, 8*b* and 9 show a result of the above masking in more detail. FIG. 8*a* shows a cut-out view 167 of FIG. 7*a*, and FIG. 8*b* shows a cut-out view 168 of FIG. 7*b*. Visible in FIG. 8*a* is the breast implant 125 and a gradient 192 between the breast implant 125 and the surrounding tissue. FIG. 8*b* shows the body of the breast implant 125 being masked by a mask 175, and a border area 193 of the breast implant 125 being visible. Moreover, a further gradient 194 between the mask 175 and the breast implant 125 is visible. Lastly, a line segment 190 is shown. FIG. 9 shows a plot of the intensity of the cut-out view 168 as a function of a position along the line segment 190. Visible is surrounding tissue 191 having a low intensity, a gradient 192 between the surrounding tissue 191 and the breast implant in which the intensity gradually increases, a border area 193 of the breast implant having a high intensity, a further gradient 193 between the breast implant and the mask 195 in which the intensity gradually decreases, and the mask 195 having a medium to low intensity.

For obtaining the result shown in FIGS. 8*a*, 8*b*, and 9, the processor 130 may be arranged for detecting, in the image, an object gradient 192 constituting a gradual transition between the object 125 and its surroundings for keeping clear the border area 193 of the object 125 between the mask 125 and the object gradient 192. This is visible in FIG. 9 as the border area 193 of the object being separated from the object gradient 192. Detecting the object gradient 192 may comprise using an edge detection technique, and marking a width of the edge, i.e., an area in which the edge gradually rises, as the object gradient 192. Moreover, the processor 130 may be arranged for detecting the object gradient 192 in the image, and generating the mask gradient 194 as differing in width and/or shape from the object gradient 192 for visually differentiating the object gradient 192 from the mask gradient 194 in the output image. In the example of FIG. 9, the mask gradient 194 is shown as having a larger width than the object gradient 192. The shape of both gradients, however, is similar in FIG. 9, i.e., a linear slope, but may be different as well, e.g. a linear and a non-linear slope.

In general, it is noted that the term image refers to a multi-dimensional image, such as a two-dimensional (2-D) image or a three-dimensional (3-D) image. Here, the term 3-D image refers to a volumetric image, i.e., having three spatial dimensions. The image is made up of image elements. The image elements may be so-termed picture elements, i.e., pixels, when the image is a 2-D image. The image elements may also be so-termed volumetric picture elements, i.e., voxels, when the image is a volumetric image. The term value in reference to an image element refers to a displayable property that is assigned to the image element, e.g., a value of a pixel may represent a luminance and/or chrominance of the pixel, or may indicate an opacity or translucency of a voxel within the volumetric image.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An image processing apparatus comprising:

an input that receives an image;

a processor that:

detects an object in the image, determines a contour of the object in the image that defines a perimeter of the object;

generating a mask that is circumscribed by the perimeter of the object to produce a first region of the object within a perimeter of the mask and a second region of the object between the perimeter of the object and the perimeter of the mask, wherein the second region comprises a continuous border area of at least a given width between the perimeter of the object and the perimeter of the mask; and applies the mask to the object in the image to produce an output image that includes a substantial reduction in the visibility of the first region of the object within the mask and enables viewing of the second region of the object within the border area; and an output that provides the output image to a display.

2. The image processing apparatus of claim 1, wherein the processor generates the mask by setting the perimeter of the mask at the perimeter of the object, then reducing the perimeter of the mask in an inward direction with respect to the object to provide the continuous border area.

3. The image processing apparatus of claim 2, wherein the processor reduces the perimeter of the mask by applying a morphological erosion technique to the mask at the perimeter of the object.

4. The image processing apparatus of claim 1, wherein the processor detects, in the image, an object gradient area constituting a gradual transition between the object and its surroundings, and includes the object gradient area in the second region of the object that forms the continuous border area.

5. The image processing apparatus of claim 1, wherein the width of the border area of the object is between 2 mm and 10 mm when the output image is displayed on a display.

6. The image processing apparatus of claim 1, further comprising a user input that enables a user to determine a zoom factor for zooming in on or zooming out of the output image, and wherein the processor generates the mask so as to maintain a predefined displayed width of the border area of the object when the output image is displayed on a display based on the zoom factor.

7. The image processing apparatus of claim 1, wherein, when the mask is applied to the object, the processor generates a mask gradient in the output image for establishing a gradual visibility transition within the border area.

8. The image processing apparatus of claim 7, wherein the processor generates the mask gradient by blending a border area of the mask with the object.

9. The image processing apparatus of claim 7, wherein the processor detects, in the image, an object gradient constituting a gradual transition between the object and its surroundings, and generates the mask gradient as differing in at least one of a width or shape from the object gradient for visually differentiating the object gradient from the mask gradient in the output image.

10. The image processing apparatus of claim 7, further comprising a user input that enables a user to define at least one of a width or shape of the mask gradient.

11. The image processing apparatus of claim 1, wherein the processor reduces the visibility of the object by reducing at least one of brightness or contrast of the first region of the object within the mask.

12. A workstation comprising the image processing apparatus of claim 1.

13. An imaging apparatus comprising the image processing apparatus of claim 1.

14. A method comprising:

obtaining an image;

detecting an object in the image;

establishing an object contour of the object that defines a perimeter of the object, generating, based on the object contour, a mask that is circumscribed by the perimeter of the object and has a smaller perimeter than the perimeter of the object, wherein the mask defines a first region of the object within the perimeter of the mask, and a second region of the object between the perimeter of the object and the perimeter of the mask, wherein the second region comprises a continuous border area of at least a given width that provides visibility of the second region of the object within the border area in the output image, and applying the mask to produce a substantially reduced visibility of the first region of the object within the mask in the output image; and providing the output image to a display.

15. A non-transitory computer-readable medium that includes a program that, when executed by a processing system, causes the processor system to perform the method of claim 14.

16. A non-transitory computer-readable medium that includes a program that, when executed by a processing system, causes the processing system to:

receive an image;

detect an object in the image;

determine an object contour of the object in the image that defines a perimeter of the object;

define a mask that is circumscribed by the perimeter of the object and has a smaller perimeter than the perimeter of the object;

apply the mask to the object to produce an output image having a first region of the object within the perimeter of the mask and a second region of the object between the perimeter of the object and the perimeter of the mask, wherein the second region comprises a continuous border area between the mask and the object contour that provides visibility of the second region of the object within the border area, and wherein applying the mask produces a substantially reduced visibility of the first region of the object within the mask in the output image; and provide the output image to a display.

17. The medium of claim 16, wherein the program causes the processing system to define the mask by setting the perimeter of the mask to the perimeter of the object, then reducing the perimeter of the mask in an inward direction with respect to the object to provide the continuous border area.

18. The medium of claim 16, wherein the program causes the processing system to reduce the perimeter of the mask by applying a morphological erosion technique to the mask at the perimeter of the object.

19. The medium of claim 16, wherein the program causes the processing system to establish the border area to be within a predefined range of width in display pixels, regardless of a zoom factor applied to the output image.

20. The medium of claim 16, wherein the program causes the processing system to generate a mask gradient in the output image to provide a gradual visibility transition within the border area.

* * * * *